(12) United States Patent
Hou et al.

(10) Patent No.: US 12,123,730 B2
(45) Date of Patent: Oct. 22, 2024

(54) ROUTE MANAGEMENT METHODS AND SYSTEMS FOR ELECTRIC VEHICLES

(71) Applicant: Noodoe Group Inc., Wilmington, DE (US)

(72) Inventors: Yi-An Hou, Taipei (TW); Ming-San Huang, Taipei (TW); En-Yu Shih, Taipei (TW); Yu-Ting Liou, Taipei (TW); Chun-Hung Kung, Taipei (TW)

(73) Assignee: NOODOE GROUP INC., New Castle, DE (US)

( * ) Notice: Subject to any disclaimer, the term of this patent is extended or adjusted under 35 U.S.C. 154(b) by 277 days.

(21) Appl. No.: 17/728,268

(22) Filed: Apr. 25, 2022

(65) Prior Publication Data

US 2022/0412757 A1 Dec. 29, 2022

(30) Foreign Application Priority Data

Jun. 28, 2021 (TW) ................................. 110123511

(51) Int. Cl.
*G01C 21/34* (2006.01)
*B60L 58/12* (2019.01)
*G07C 5/00* (2006.01)

(52) U.S. Cl.
CPC .......... *G01C 21/3469* (2013.01); *B60L 58/12* (2019.02); *G01C 21/3484* (2013.01); *G07C 5/008* (2013.01); *B60L 2240/54* (2013.01); *B60L 2240/70* (2013.01)

(58) Field of Classification Search
None
See application file for complete search history.

(56) References Cited

U.S. PATENT DOCUMENTS

| | | | |
|---|---|---|---|
| 10,563,995 B2 * | 2/2020 | Liebinger | G01C 21/3691 |
| 2010/0049397 A1 * | 2/2010 | Liu | G01C 21/3469 |
| | | | 701/31.4 |
| 2013/0151046 A1 * | 6/2013 | Choi | G08G 1/096827 |
| | | | 903/902 |
| 2015/0360688 A1 * | 12/2015 | Tanaka | B60W 30/143 |
| | | | 701/93 |
| 2017/0010116 A1 * | 1/2017 | Inoue | B60L 58/12 |
| 2020/0166358 A1 * | 5/2020 | R. Padmanaban | |
| | | | G01C 21/3484 |
| 2021/0190524 A1 * | 6/2021 | Kitagawa | G01C 21/3682 |
| 2023/0226949 A1 * | 7/2023 | Naito | G06Q 10/20 |

FOREIGN PATENT DOCUMENTS

WO 2022070495 * 4/2022 ......... G01C 21/3453

* cited by examiner

*Primary Examiner* — Christian Chace
*Assistant Examiner* — Shayne M. Gilbertson
(74) *Attorney, Agent, or Firm* — McClure, Qualey & Rodack, LLP

(57) ABSTRACT

Route management methods and systems for electric vehicles are provided. First, a driving monitoring system of an electric vehicle is used to detect a driving state of the electric vehicle. Then, the driving state is transmitted to the server via a network by the driving monitoring system. The server performs an analysis according to the driving state to obtain a driving behavior index of a driver corresponding to the electric vehicle. Then, a plurality of routes are provided in the server, wherein each route includes a plurality of stations, and average distance between two stations. The server selects one of the routes according to the driving behavior index, and assigns the selected route to the driver of the electric vehicle.

9 Claims, 8 Drawing Sheets

ROUTE MANAGEMENT METHODS AND SYSTEMS FOR ELECTRIC VEHICLES

BACKGROUND OF THE INVENTION

Field of the Invention

The disclosure relates generally to route management methods and systems for electric vehicles, and, more particularly to methods and systems that can manage the route of an electric vehicle based on the analysis of the driving state.

Description of the Related Art

Recently, with the rising awareness of environmental protection and electric vehicle technology advances, the development of electric vehicles powered by electrical energy to replace traditional vehicles powered by fossil fuels has gradually become an important goal in the automotive field, thus making electric vehicles become more and more popular. In order to increase the range and willingness to use electric vehicles, many countries or cities have begun to set up charging stations in public places to provide electricity to electric vehicles, and have also begun to plan the deployment of a large number of charging stations in urban areas or scenic areas, so as to make the charging of electric vehicles more convenient.

Additionally, traditional transportation vehicles, such as buses or freight fleets, need to use a lot of gasoline or diesel as fuel, which are highly polluting vehicles. In order to reduce the harm of carbon emissions to the environment, governments are also committed to developing electric vehicle fleets that use electricity to replace traditional gasoline fleets. Generally, electric vehicles for transportation, such as electric buses or freight fleets, may have multiple different routes, and each route may include multiple fixed stops/stations. The driver can perform various services at each station according to the assigned route, such as the service of picking up and dropping off passengers, or the delivery of goods. It is noted that, the distances between stations of different routes may be different, and the routes to which different drivers may be assigned may also be different. However, due to the different driving behavior of each driver, poor driving behavior may lead to a large consumption of battery power of the electric vehicle, resulting in insufficient power and increasing the number and time of charging at the charging station, resulting in travel delay or failure to successfully complete the follow-up route task. Improper route arrangement will cause the worry of power shortage and missed shift of electric vehicles, and also cause complaints from customers, hindering the development of electric fleets.

BRIEF SUMMARY OF THE INVENTION

In an embodiment of a route management method for electric vehicles, which is applicable to at least one electric vehicle and a server connecting to the electric vehicle via a network, a driving state of the electric vehicle is detected by a driving monitoring system of the electric vehicle. Then, the driving state is transmitted to the server via the network by the driving monitoring system. An analysis is performed according to the driving state by the server to obtain a driving behavior index of a driver corresponding to the electric vehicle. Then, a plurality of routes are provided in the server, wherein each route includes a plurality of stations, and has an average distance between two stations. One of the routes is selected by the server according to the driving behavior index, and the selected route is assigned to the driver of the electric vehicle.

An embodiment of a route management system for electric vehicles comprises at least one electric vehicle and a server. The electric vehicle comprises a driving monitoring system and a network connection unit. The driving monitoring system detects a driving state of the electric vehicle. The network connection unit transmits the driving state to the server via a network. The server comprises a network connection unit, a storage unit, and a processing unit. The server receives the driving state of the electric vehicle through network connection unit via the network. The storage unit comprises a plurality of routes are provided in the server, wherein each route includes a plurality of stations, and has an average distance between two stations. The processing unit performs an analysis according to the driving state to obtain a driving behavior index of a driver corresponding to the electric vehicle, selects one of the routes according to the driving behavior index, and assigns the selected route to the driver of the electric vehicle.

In some embodiments, the driving state corresponding to the electric vehicle comprises an energy consumption state of the electric vehicle, and when the energy consumption state is larger, the server selects a specific route having a greater average distance between two stations among the routes and assigns the specific route to the driver corresponding to the electric vehicle.

In some embodiments, the driving state corresponding to the electric vehicle comprises an energy recharging state of the electric vehicle, and when the energy recharging state is less, the server selects a specific route having a greater average distance between two stations among the routes and assigns the specific route to the driver corresponding to the electric vehicle.

In some embodiments, the driving state corresponding to the electric vehicle comprises a state of rapid acceleration and deceleration of the electric vehicle, and when the state of rapid acceleration and deceleration is frequent, the server selects a specific route having a greater average distance between two stations among the routes and assigns the specific route to the driver corresponding to the electric vehicle.

In some embodiments, the driving state corresponding to the electric vehicle comprises an average mileage per energy unit of the electric vehicle, and when the average mileage per energy unit is low, the server selects a specific route having a greater average distance between two stations among the routes and assigns the specific route to the driver corresponding to the electric vehicle.

Route management methods for electric vehicles may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Figure 1:
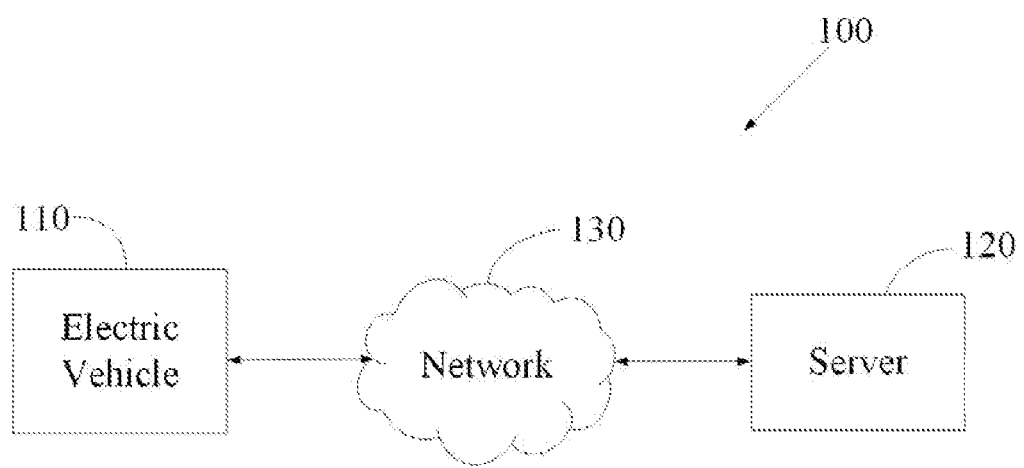
FIG. 1 is a schematic diagram illustrating an embodiment of an embodiment of a route management system for electric vehicles of the invention.

FIG. 1 is a schematic diagram illustrating an embodiment of an embodiment of a route management system for electric vehicles of the invention. As shown in FIG. 1, the route management system for electric vehicles 100 comprises at least one electric vehicle 110 and a server 120. In some embodiments, the electric vehicle 110 can be coupled to the server 120 via a network 130, such as a wired network, a telecommunication network, and a wireless network, such as a Wi-Fi network. The electric vehicle 110 may provide service according to a route, wherein the route may include one or more stops/stations. For example, the stations may be set at each transfer station and/or stopping station in the driving route of the electric vehicle 110, so the electric vehicle 110 may stop at a specific transfer station or stopping station to pick up and drop off passengers, but the present invention is not limited to this. The server 120 can generate instructions and transmit the instructions to the electric vehicle 110 via the network 130 to manage the route and/or schedule of the electric vehicles 110, assign which electric vehicle 110 to drive which route, and transmit the relevant instructions to the electric vehicle 110.

Figure 2:
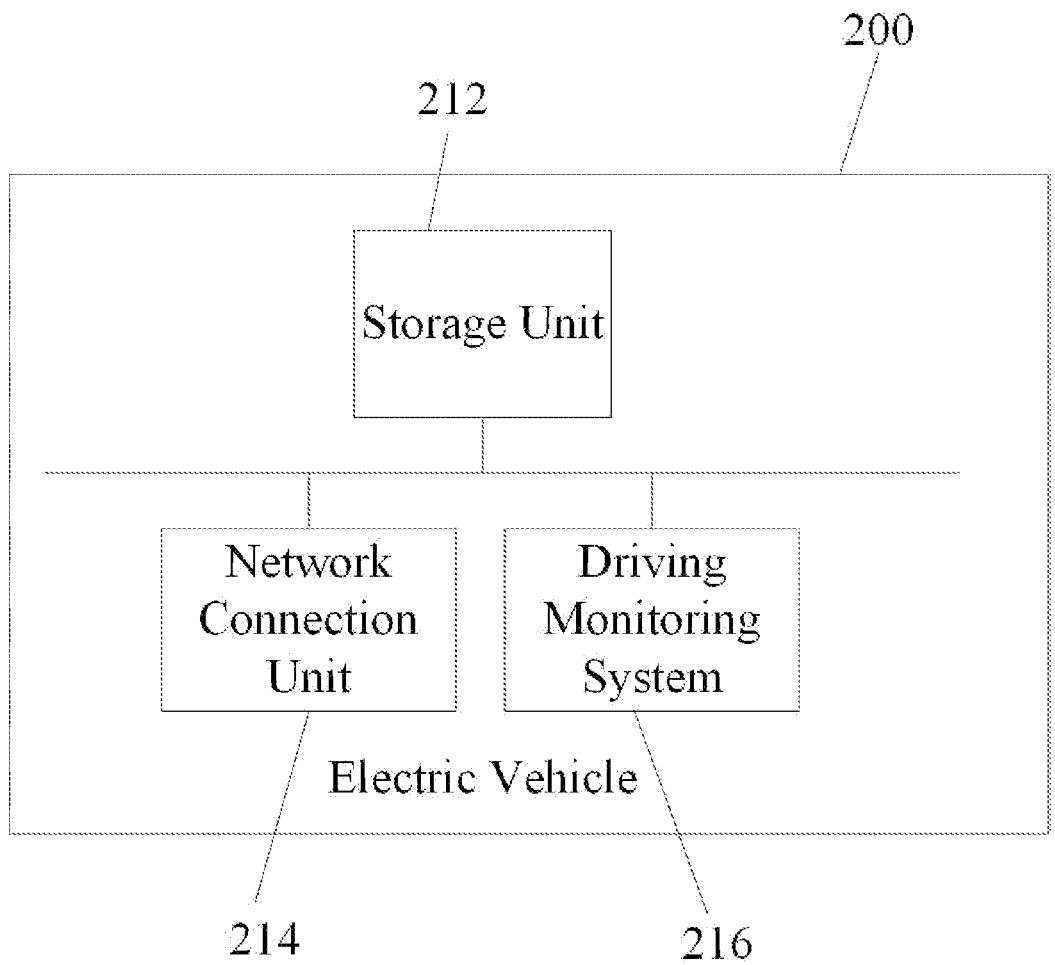
FIG. 2 is a schematic diagram illustrating an embodiment of an electric vehicle of the invention.

FIG. 2 is a schematic diagram illustrating an embodiment of an electric vehicle of the invention. The electric vehicle 200 shown in FIG. 2 can be applied to the electric vehicle 110 in FIG. 1, which has processing and computing capabilities to perform related management operations belonging to the electric vehicle, and has network connection functions for transmission, reception, download, or update various parameters and information required for the management operations.

The electric vehicle 200 comprises a storage unit 212, a network connection unit 214, and a driving monitoring system 216. The storage unit 212 may be a memory for storing and recording related data, such as electric vehicle related information, such as an electric vehicle identification code, driving information of a driver of the corresponding electric vehicle, driving state information, and the like. It should be noted that the foregoing information is only an example of this case, and the present invention is not limited thereto. The network connection unit 214 can transmit, receive, download or update various parameters and information required for management operations through a network, such as a wired network, a telecommunication network, and a wireless network, such as a Wi-Fi network. The driving monitoring system 216 may have a corresponding detection circuit or logic to detect a driving state of a corresponding electric vehicle. The driving monitoring system 216 can cooperate with the server 120 to execute the route management methods for electric vehicles of this application, and the relevant details will be described later. It should be noted that, in some embodiments, the driving monitoring system 216 may comprise a processing unit, which may be a general-purpose controller, a Micro-Control Unit (MCU), or a Digital Signal Processor (Digital Signal Processor, DSP), etc., to provide data analysis, processing and computing functions, but the present invention is not limited to this. In one embodiment, the processing unit can transmit the driving state of the corresponding electric vehicle via a network by using the network connection unit 214 to a cloud management server, such as the server 120 to perform subsequent route management of the electric vehicle.

Figure 3:
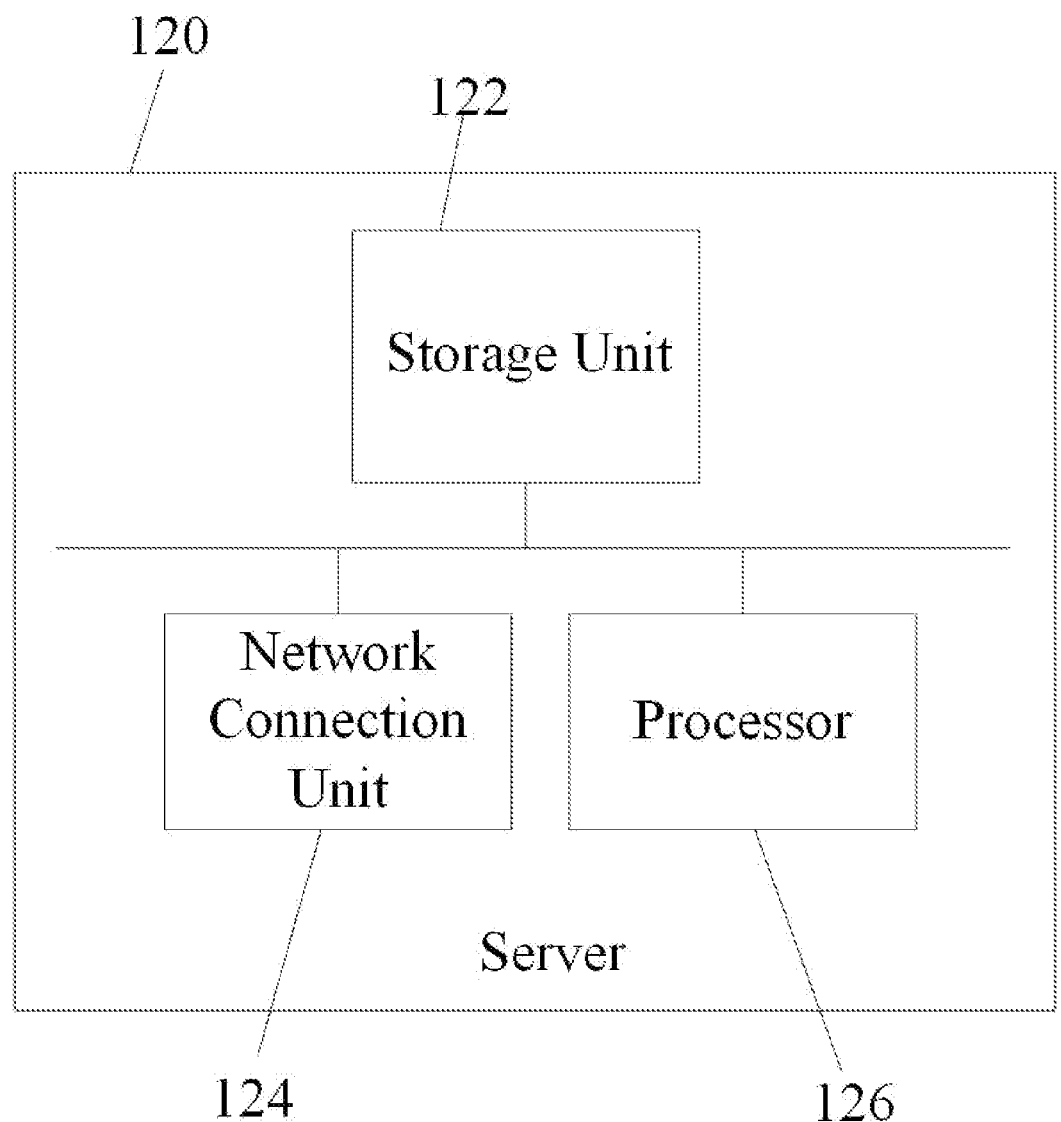
FIG. 3 is a schematic diagram illustrating an embodiment of a server of the invention.

FIG. 3 is a schematic diagram illustrating an embodiment of a server of the invention. As shown in FIG. 3, the server 120 of the invention can be any processor-based electronic device, which comprises at least a storage unit 122, a network connection unit 124, and a processor 126. It is noted that, the server 120 can receive various data corresponding to the respective electric vehicle. For example, the server 120 may receive the driving state of the respective electric vehicles, and perform an analysis according to the driving state for subsequent route managements.

The storage unit 122, such as a memory, comprises a database DB for storing and recording related data, such as various data of the corresponding electric vehicle. In addition, in some embodiments, the database DB can also record the driver identification codes corresponding to the drivers of the respective electric vehicles. By using the network connection unit 124, the server 120 can be coupled and communicated with the electric vehicle 110 via the network 130, such as a wired network, a telecommunication network, and a wireless network, such as a Wi-Fi network. Related data/signals/commands can be transmitted to the respective electric vehicles 110 via the network 130, thus to assign specific routes to the drivers of the electric vehicles. The processor 126 can control the operations of the relevant software and hardware in the server 120, and execute the route management methods for electric vehicles of the invention, and the relevant details will be described later. It should be noted that, in some embodiments, the processor 126 may be a general-purpose controller, a Micro-Control Unit (MCU), or a Digital Signal Processor (DSP), etc., for providing data analysis, processing and calculation functions, but the present invention is not limited to this.

Figure 4:
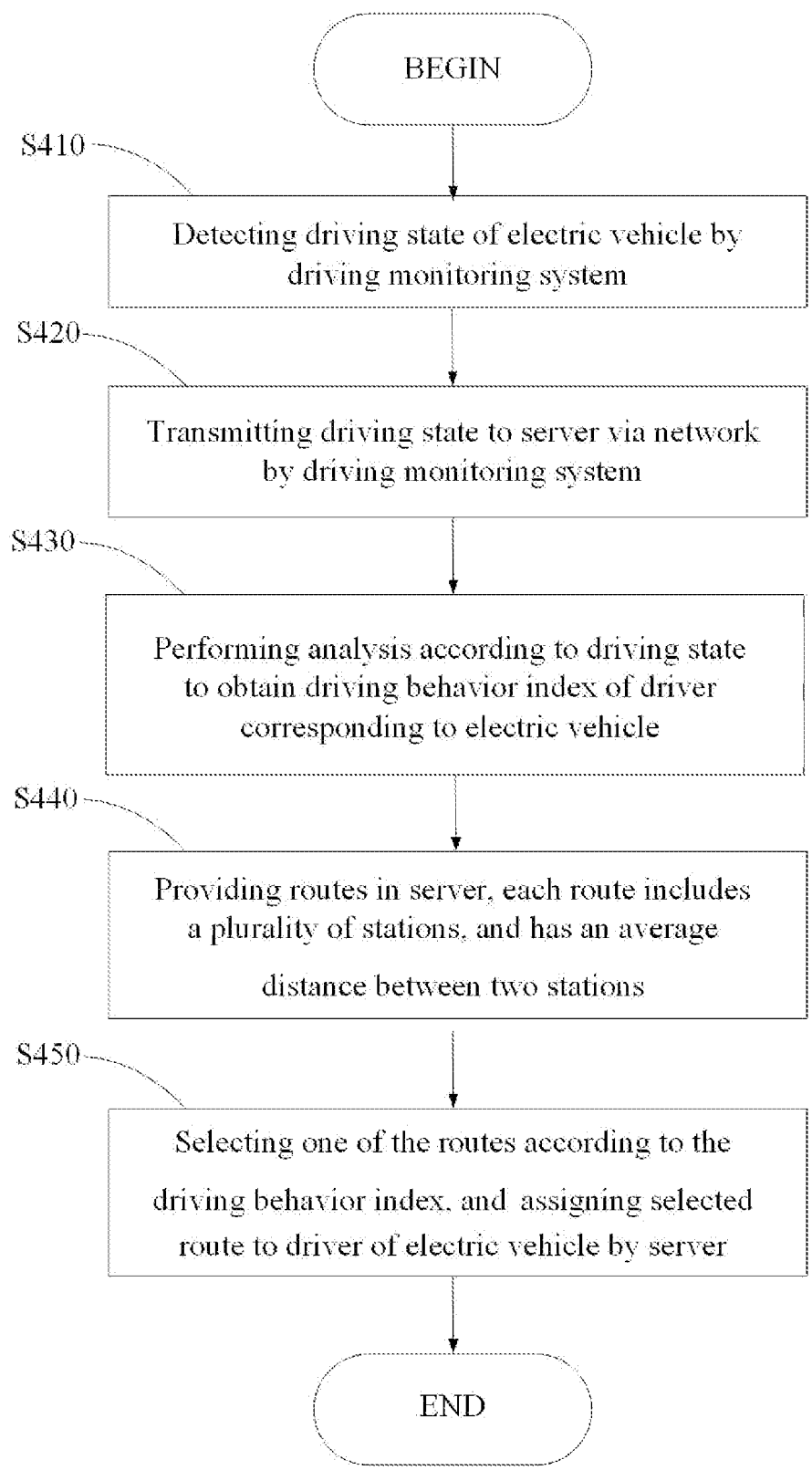
FIG. 4 is a flowchart of an embodiment of a route management method for electric vehicles of the invention.

FIG. 4 is a flowchart of an embodiment of a route management method for electric vehicles of the invention. The route management method for electric vehicles of the invention is applicable to a server, and at least one electronic vehicle connected with the server via a network.

In step S410, a driving state of the electric vehicle is detected by a driving monitoring system of the electric vehicle. For example, in some embodiments, the driving state of the electric vehicle may include an energy consumption state, an energy recharging state, a rapid acceleration and deceleration state of the electric vehicle, and/or an average mileage per energy unit of the electric vehicle. It should be noted that, the driving state is only an example of this case, and the present invention is not limited thereto. Then, in step S420, the driving state is transmitted to the server via the network by the driving monitoring system.

After the server receives the driving state, in step S430, the server performs an analysis according to the driving state to obtain a driving behavior index of a driver of the electric vehicle. Then, in step S440, a plurality of routes are provided in the server, wherein each route includes a plurality of stations, and has an average distance between two stations. For example, in one embodiment, the server may provide route A and route B, wherein route A includes stations A1, A2 and A3, and there is an average distance between two stations A1, A2 and A3. Similarly, route B includes stations B1, B2, B3 and B4, and there is an average distance between two stations B1, B2, B3 and B4. In step S450, the server selects one of the routes according to the driving behavior index, and assigns the selected route to the driver of the electric vehicle. In other words, the various routes can be assigned to respective drivers who have different driving behavior index. Therefore, proper route management for electric vehicles can be carried out according to the driving behavior corresponding to the driver of the electric vehicle, which can effectively reduce the possibility that the electric vehicle cannot complete the route due to excessive power consumption, thereby increasing the battery life and service life of the electric vehicle.

Figure 5:
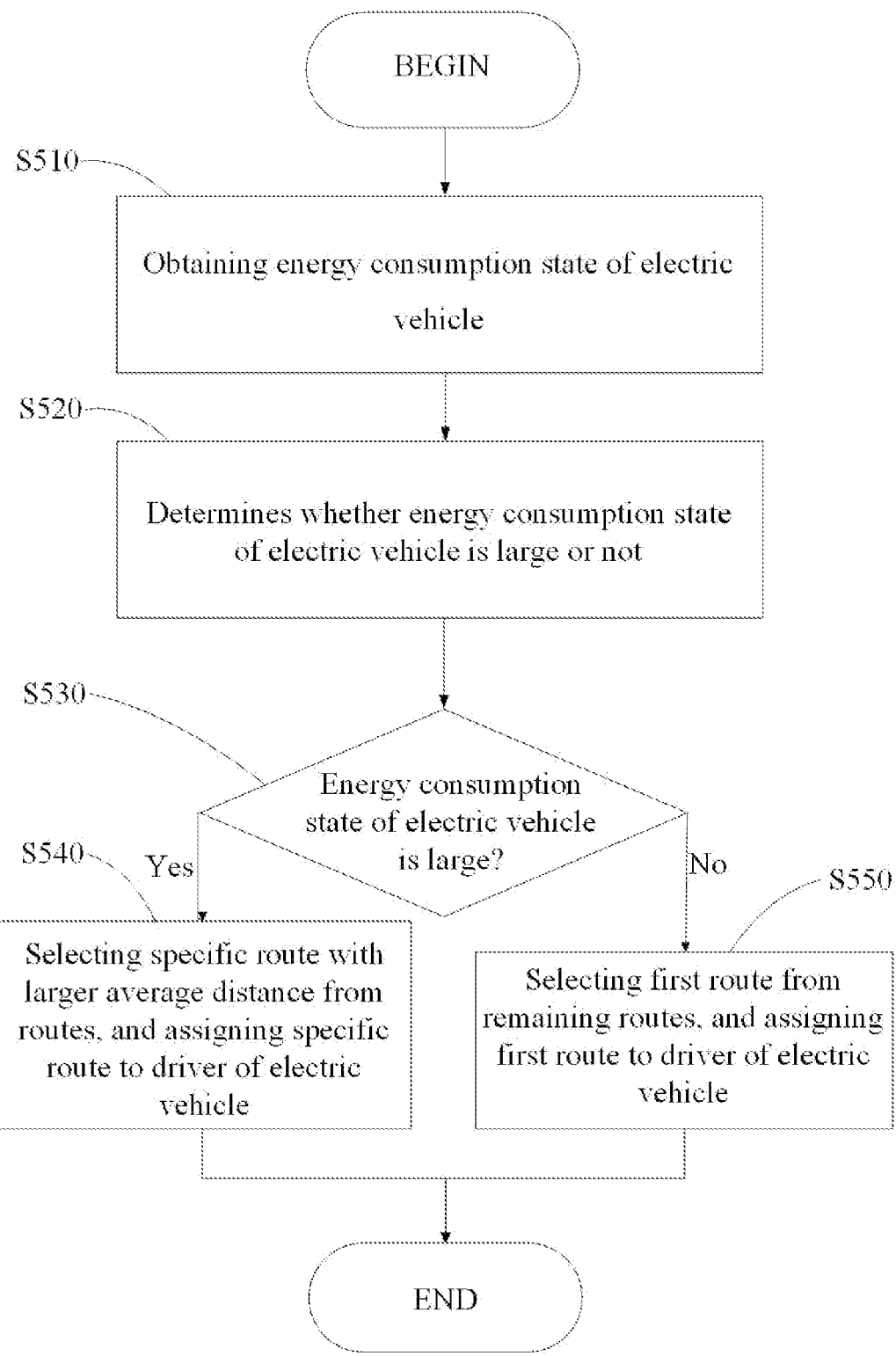
FIG. 5 is a flowchart of another embodiment of a route management method for electric vehicles of the invention.

FIG. 5 is a flowchart of another embodiment of a route management method for electric vehicles of the invention. The route management method for electric vehicles of the invention is applicable to a server, and at least one electronic vehicle connected with the server via a network. In the embodiment, the server can perform the route management according to an energy consumption state of the electric vehicle.

First, in step S510, the server obtains the energy consumption state of the electric vehicle, and in step S520, determines whether the energy consumption state of the electric vehicle is large or not. In this embodiment, the driving monitoring system of the electric vehicle can transmit the driving state to the server via the network, and the server can receive the driving state of the electric vehicle via the network, wherein the driving state includes the energy consumption state of the electric vehicle. In some embodiments, a threshold value of the energy consumption state may be preset, and when the energy consumption state of the electric vehicle is greater than the threshold value, it is determined that the energy consumption state of the electric vehicle is large. When the energy consumption of the electric vehicle is large (Yes in step S530), in step S540, the server selects a specific route with a larger average distance between two stations from the routes, and assigns the specific route to the driver of the electric vehicle. When the energy consumption state of the electric vehicle is not large (No in step S530), in step S550, the server selects a first route from the remaining routes, and assigns the first route to the driver of the electric vehicle. In some embodiments, the first route may be a route with a smaller average distance between two stations.

Figure 6:
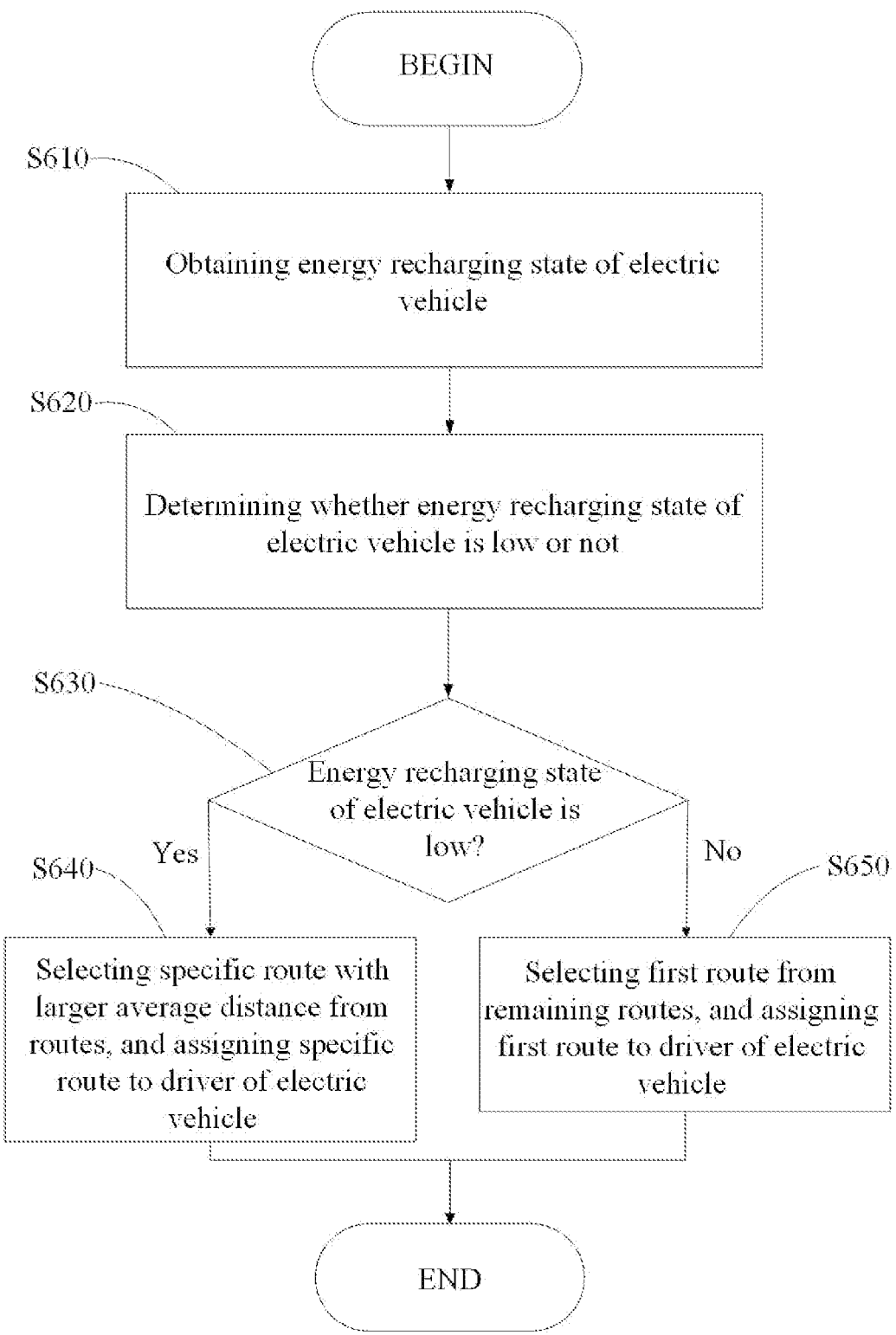
FIG. 6 is a flowchart of another embodiment of a route management method for electric vehicles of the invention.

FIG. 6 is a flowchart of another embodiment of a route management method for electric vehicles of the invention. The route management method for electric vehicles of the invention is applicable to a server, and at least one electronic vehicle connected with the server via a network. In the embodiment, the server can perform the route management according to an energy recharging state of the electric vehicle.

First, in step S610, the server obtains the energy recharging state of the electric vehicle, and in step S620, determines whether the energy recharging state of the electric vehicle is low or not. In this embodiment, the driving monitoring system of the electric vehicle can transmit the driving state to the server via the network, and the server can receive the driving state of the electric vehicle via the network, wherein the driving state includes the energy recharging state of the electric vehicle. In some embodiments, a threshold value of the energy recharging state of the electric vehicle may be preset. When the energy recharging state of the electric vehicle is less than the threshold value, it is determined that the energy recharging state of the electric vehicle is less. When the energy recharging state of the electric vehicle is low (Yes in step S630), in step S640, the server selects a specific route with a larger average distance between two stations from the routes, and assigns the specific route to the driver of the electric vehicle. When the energy recharging state of the electric vehicle is not low (No in step S630), in step S650, the server selects a first route from the remaining routes and assigns the first route to the driver of the electric vehicle. In some embodiments, the first route may be a route with a smaller average distance between two stations.

Figure 7:
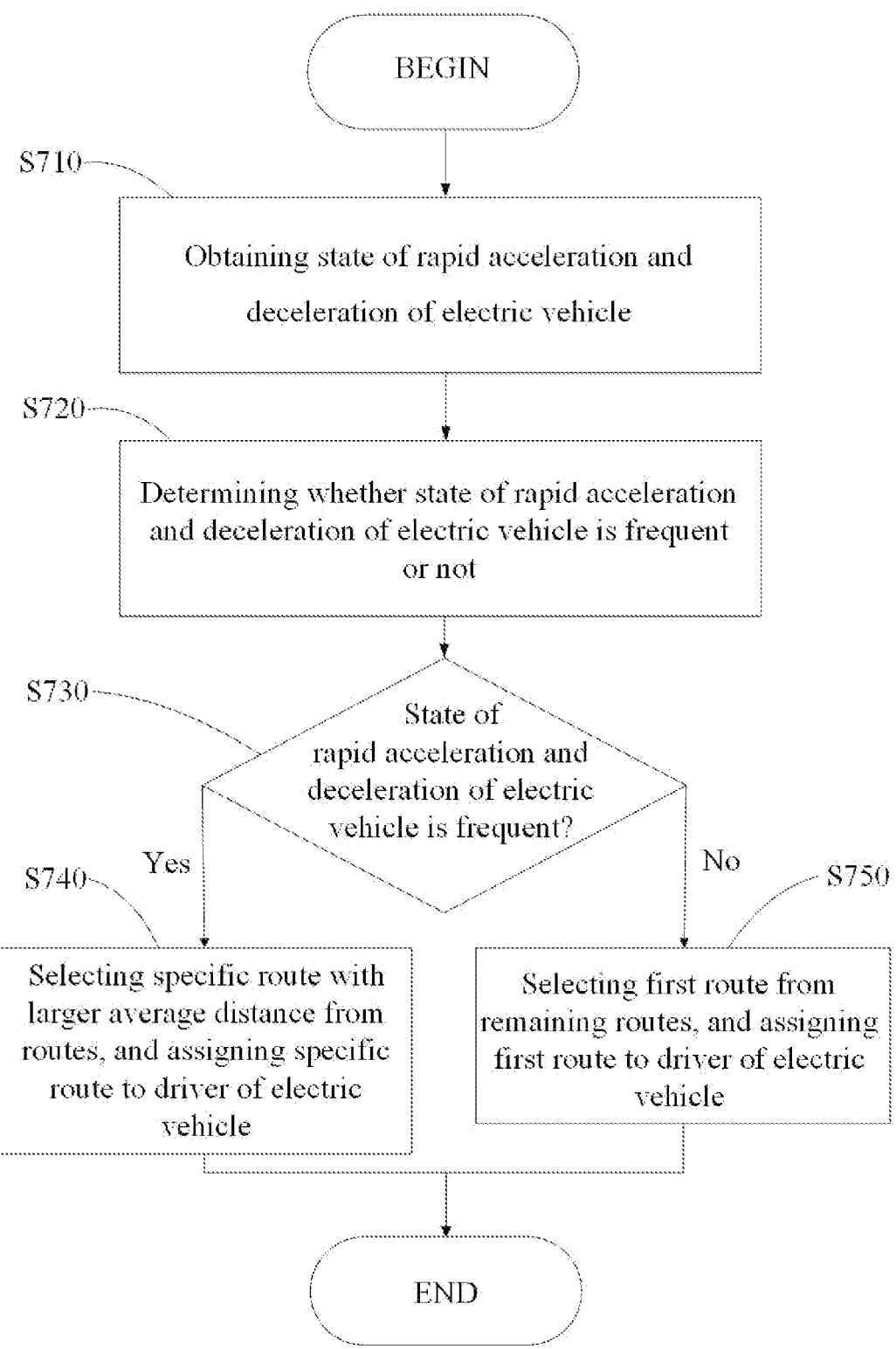
FIG. 7 is a flowchart of another embodiment of a route management method for electric vehicles of the invention.

FIG. 7 is a flowchart of another embodiment of a route management method for electric vehicles of the invention. The route management method for electric vehicles of the invention is applicable to a server, and at least one electronic vehicle connected with the server via a network. In the embodiment, the server can perform the route management according to a state of rapid acceleration and deceleration of the electric vehicle.

First, in step S710, the server obtains a state of rapid acceleration and deceleration of the electric vehicle, and in step S720, determines whether the state of rapid acceleration and deceleration of the electric vehicle is frequent or not. In this embodiment, the driving monitoring system of the electric vehicle can transmit the driving state to the server via the network, and the server can receive the driving state of the electric vehicle via the network, wherein the driving state includes a state of rapid acceleration and deceleration of the electric vehicle. In some embodiments, a threshold value of the state of rapid acceleration and deceleration of the electric vehicle may be preset. When the state of rapid acceleration and deceleration of the electric vehicle is greater than the threshold value, it is determined that the state of rapid acceleration and deceleration of the electric vehicle is frequent. When the state of rapid acceleration and deceleration of the electric vehicle is frequent (Yes in step S730), in step S740, the server selects a specific route with a larger average distance between two stations from the routes, and assigns the specific route to the driver of the electric vehicle. When the state of rapid acceleration and deceleration of the electric vehicle is not frequent (No in step S730), in step S750, the server selects a first route from the remaining routes and assigns the first route to the driver of the electric vehicle. In some embodiments, the first route may be a route with a smaller average distance between two stations.

Figure 8:
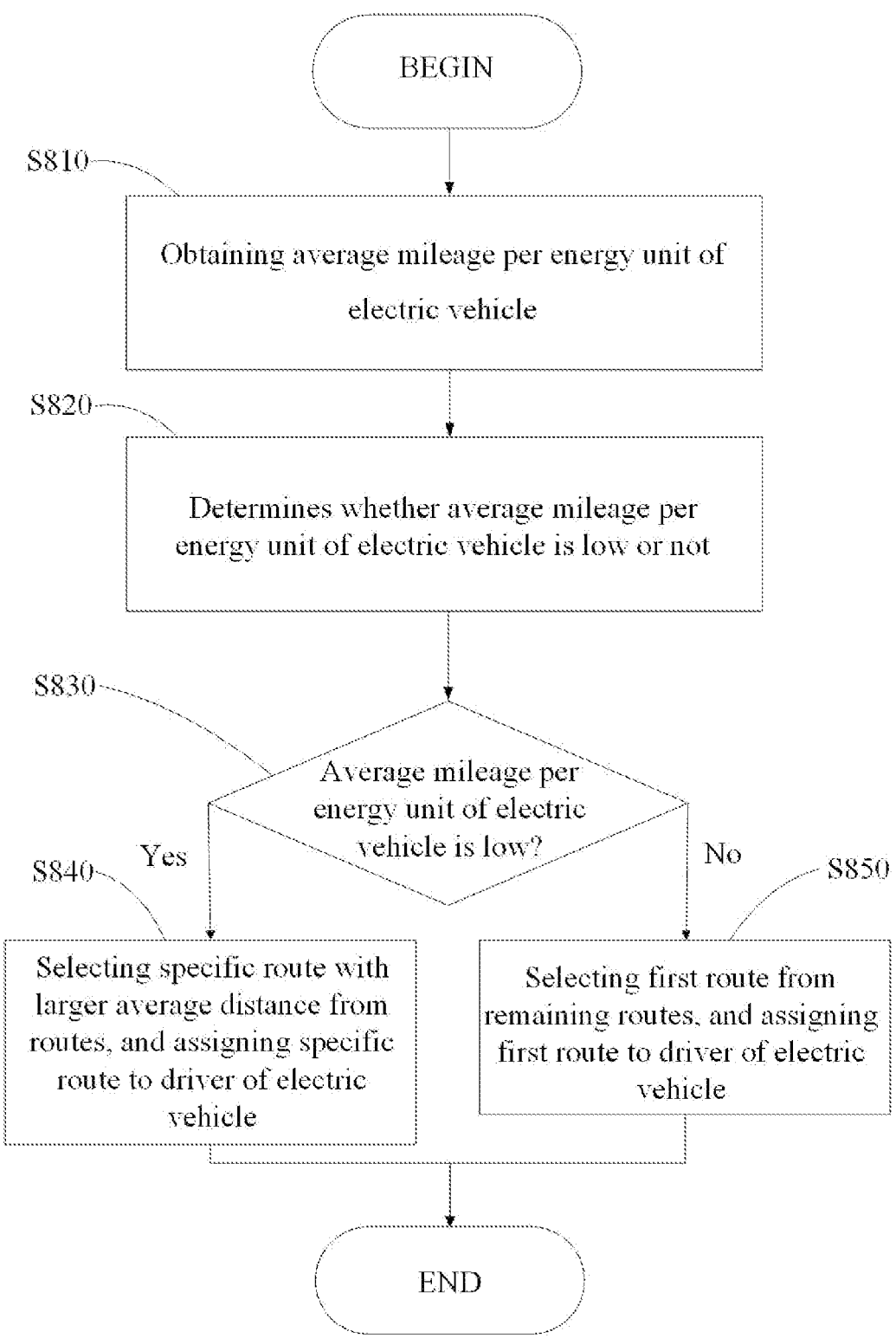
FIG. 8 is a flowchart of another embodiment of a route management method for electric vehicles of the invention.

FIG. 8 is a flowchart of another embodiment of a route management method for electric vehicles of the invention. The route management method for electric vehicles of the invention is applicable to a server, and at least one electronic vehicle connected with the server via a network. In the embodiment, the server can perform the route management according to an average mileage per energy unit of the electric vehicle.

First, in step S810, the server obtains the average mileage per energy unit of the electric vehicle, and in step S820, determines whether the average mileage per energy unit of the electric vehicle is low or not. In this embodiment, the driving monitoring system of the electric vehicle can transmit the driving state to the server via the network, and the server can receive the driving state of the electric vehicle via the network, wherein the driving state includes the average mileage per energy unit of the electric vehicle. In some embodiments, a threshold value of the average mileage per energy unit of the electric vehicle may be preset. When the average mileage per energy unit is less than the threshold value, it is determined that the average mileage per energy unit is low. When the average mileage per energy unit of the electric vehicle is low (Yes in step S830), in step S840, the server selects a specific route with a larger average distance between two stations from the routes, and assigns the specific route to the driver of the electric vehicle. When the average mileage per energy unit of the electric vehicle is not low (No in step S830), in step S850, the server selects a first route from the remaining routes and assigns the first route to the driver of the electric vehicle. In some embodiments, the first route may be a route with a smaller average distance between two stations.

Therefore, the route management methods and systems for electric vehicles of the invention can collect and analyze the driving state of electric vehicles, so as to obtain the driving behavior index corresponding to the driver of the electric vehicle, and accordingly perform the route managements for electric vehicles to assign a proper route to the driver of the electric vehicle, thereby increasing the flexibility and efficiency of route management for the electric vehicle, effectively reducing the possibility that the route cannot be completed as scheduled due to excessive power consumption of electric vehicles, and increasing the battery life and service life of electric vehicles.

Route management methods for electric vehicles, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for executing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for executing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A route management method for electric vehicles, which is applicable to at least one electric vehicle and a server connecting to the electric vehicle via a network, comprising:
    detecting a driving state of the electric vehicle by a driving monitoring system of the electric vehicle, wherein the driving monitoring system has circuits for performing the detection;
    transmitting the driving state to the server via the network by the driving monitoring system;
    performing an analysis according to the driving state to obtain a driving behavior index of a driver corresponding to the electric vehicle;
    providing a plurality of routes in the server, wherein each route includes a plurality of stations, and has an average distance between two stations;
    selecting one of the routes according to the driving behavior index by the server; and
    assigning the selected route to the driver of the electric vehicle by the server,
    wherein the driving state corresponding to the electric vehicle comprises an energy consumption state of the electric vehicle, and when the energy consumption state is larger, a specific route having a greater average distance between two stations is selected among the routes and assigned to the driver corresponding to the electric vehicle.

2. The method of claim 1, wherein the driving state corresponding to the electric vehicle comprises an energy recharging state of the electric vehicle, and when the energy recharging state is less, a specific route having a greater average distance between two stations is selected among the routes and assigned to the driver corresponding to the electric vehicle.

3. The method of claim 1, wherein the driving state corresponding to the electric vehicle comprises a state of rapid acceleration and deceleration of the electric vehicle, and when the state of rapid acceleration and deceleration is frequent, a specific route having a greater average distance between two stations is selected among the routes and assigned to the driver corresponding to the electric vehicle.

4. The method of claim 1, wherein the driving state corresponding to the electric vehicle comprises an average mileage per energy unit of the electric vehicle, and when the average mileage per energy unit is low, a specific route having a greater average distance between two stations is selected among the routes and assigned to the driver corresponding to the electric vehicle.

5. A route management system for electric vehicles, comprising:
    at least one electric vehicle, comprising:
        a driving monitoring system having circuits for detecting a driving state of the electric vehicle; and
        a first network connecting unit having circuits for transmitting the driving state via a network; and
    a server, comprising:
        a second network connection unit having circuits for receiving the driving state from the electric vehicle via the network;
        a storage unit comprising a plurality of routes in the server, wherein each route includes a plurality of stations, and average distance between two stations; and
        a processing unit performing an analysis according to the driving state to obtain a driving behavior index of a driver corresponding to the electric vehicle, selecting one of the routes according to the driving behavior index, and assigning the selected route to the driver of the electric vehicle, wherein the driving state corresponding to the electric vehicle comprises an energy consumption state of the electric vehicle, and when the energy consumption state is larger, the server selects a specific route having a greater average distance between two stations among the routes and assigns the specific route to the driver corresponding to the electric vehicle.

6. The system of claim 5, wherein the driving state corresponding to the electric vehicle comprises an energy recharging state of the electric vehicle, and when the energy recharging state is less, the server selects a specific route having a greater average distance between two stations among the routes and assigns the specific route to the driver corresponding to the electric vehicle.

7. The system of claim 5, wherein the driving state corresponding to the electric vehicle comprises a state of rapid acceleration and deceleration of the electric vehicle, and when the state of rapid acceleration and deceleration is frequent, the server selects a specific route having a greater average distance between two stations among the routes and assigns the specific route to the driver corresponding to the electric vehicle.

8. The system of claim 5, wherein the driving state corresponding to the electric vehicle comprises an average mileage per energy unit of the electric vehicle, and when the average mileage per energy unit is low, the server selects a specific route having a greater average distance between two stations among the routes and assigns the specific route to the driver corresponding to the electric vehicle.

9. A machine-readable storage medium comprising a computer program, which, when executed, causes a device to perform a route management method for electric vehicles, which is applicable to at least one electric vehicle and a server connecting to the electric vehicle via a network, wherein the method comprises:

detecting a driving state of the electric vehicle;
  transmitting the driving state to the server via the network;
  performing an analysis according to the driving state to obtain a driving behavior index of a driver corresponding to the electric vehicle;
  providing a plurality of routes, wherein each route includes a plurality of stations, and average distance between two stations;
  selecting one of the routes according to the driving behavior index; and
  assigning the selected route to the driver of the electric vehicle,
  wherein the driving state corresponding to the electric vehicle comprises an energy consumption state of the electric vehicle, and when the energy consumption state is larger, a specific route having a greater average distance between two stations is selected among the routes and assigned to the driver corresponding to the electric vehicle.

* * * * *